United States Patent
Zörnack et al.

(10) Patent No.: US 9,457,843 B2
(45) Date of Patent: Oct. 4, 2016

(54) VEHICLE BODY AND USE THEREOF

(71) Applicants: Markus Zörnack, Dortmund (DE); Lothar Patberg, Moers (DE)

(72) Inventors: Markus Zörnack, Dortmund (DE); Lothar Patberg, Moers (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 14/084,130

(22) Filed: Nov. 19, 2013

(65) Prior Publication Data

US 2014/0077527 A1 Mar. 20, 2014

Related U.S. Application Data

(63) Continuation of application No. PCT/EP2012/059345, filed on May 21, 2012.

(30) Foreign Application Priority Data

May 25, 2011 (DE) .................. 10 2011 103 090

(51) Int. Cl.
- *B60J 7/00* (2006.01)
- *B62D 21/15* (2006.01)
- *B62D 25/08* (2006.01)

(52) U.S. Cl.
CPC ........... *B62D 21/152* (2013.01); *B62D 25/082* (2013.01)

(58) Field of Classification Search
CPC .. A63H 27/00; B25B 23/1427; B62D 7/159; B62M 27/02; B65D 5/5009
USPC ............... 296/203.02, 204, 193.09; 280/784
See application file for complete search history.

(56) References Cited

U.S. PATENT DOCUMENTS

| | | | | |
|---|---|---|---|---|
| 3,819,224 A | * | 6/1974 | Casey .................. | B62D 21/152 188/377 |
| 4,163,578 A | * | 8/1979 | Watson .................. | B62D 33/00 280/781 |
| 4,469,368 A | * | 9/1984 | Eger .................... | B62D 25/082 180/89.1 |
| 4,986,597 A | * | 1/1991 | Clausen ................ | B62D 21/00 29/412 |
| 5,031,958 A | * | 7/1991 | Fujita ................... | B62D 25/088 180/89.1 |

(Continued)

FOREIGN PATENT DOCUMENTS

| | | |
|---|---|---|
| CN | 101090845 A | 12/2007 |
| DE | 10023112 A1 | 11/2001 |

(Continued)

*Primary Examiner* — Kiran B Patel
(74) *Attorney, Agent, or Firm* — Reinhart Boerner Van Deuren P.C.

(57) ABSTRACT

The invention concerns a vehicle body, in particular for electric motor vehicles, having a left-hand and a right-hand front region and at least one first longitudinal member extending in one of the front regions in the longitudinal direction, wherein in the front region at least one second longitudinal member is provided, which is arranged outside the horizontal plane of the first longitudinal member and the direction of extension of which extends angularly to the direction of extension of the first longitudinal member at least in horizontal projection. The invention also concerns the use of such a vehicle body for producing a motor vehicle without a combustion engine, in particular an electric motor vehicle.

19 Claims, 4 Drawing Sheets

(56) References Cited

U.S. PATENT DOCUMENTS

| | | | | |
|---|---|---|---|---|
| 5,271,687 A * | 12/1993 | Holka | | B62D 23/005 296/203.01 |
| 5,954,364 A | 9/1999 | Nechushtan | | |
| 6,270,153 B1 * | 8/2001 | Toyao | | B62D 21/06 296/204 |
| 6,302,478 B1 * | 10/2001 | Jaekel | | B23K 26/38 296/203.04 |
| 6,871,875 B2 * | 3/2005 | Grimm | | B62D 21/12 180/312 |
| 6,932,405 B2 * | 8/2005 | Nakagawa | | B62D 21/02 296/187.12 |
| 7,036,874 B2 * | 5/2006 | Stojkovic | | B62D 25/16 296/146.11 |
| 7,341,299 B1 * | 3/2008 | Baccouche | | B62D 21/152 296/203.02 |
| 7,390,056 B1 * | 6/2008 | Stojkovic | | B62D 25/084 296/193.09 |
| 7,500,714 B2 * | 3/2009 | Abe | | B62D 21/157 296/187.09 |
| 7,641,270 B2 * | 1/2010 | Takeda | | B62D 21/152 296/193.09 |
| 7,669,917 B2 * | 3/2010 | Schiebel | | B62D 25/2027 296/187.01 |
| 7,766,420 B2 * | 8/2010 | Maruyama | | B62D 21/152 296/192 |
| 7,828,330 B2 * | 11/2010 | Tamura | | B62D 25/088 280/124.109 |
| 7,887,122 B2 * | 2/2011 | Baccouche | | B62D 21/152 296/187.09 |
| 8,056,926 B2 * | 11/2011 | Okabe | | B60R 19/34 180/311 |
| 8,708,403 B2 * | 4/2014 | Herntier | | B62D 25/08 280/781 |
| 8,752,886 B2 * | 6/2014 | Wirth | | B60K 11/085 180/68.6 |
| 8,857,902 B2 * | 10/2014 | Sekiguchi | | B62D 25/082 296/187.09 |
| 8,985,681 B2 * | 3/2015 | Fujii | | B62D 25/2036 296/204 |
| 2001/0002761 A1 * | 6/2001 | Tsuruta | | B60N 2/4221 296/187.09 |
| 2002/0008408 A1 * | 1/2002 | Tilsner | | B62D 25/082 296/193.09 |
| 2004/0155487 A1 * | 8/2004 | Joaquin | | B62D 25/20 296/204 |
| 2004/0183338 A1 * | 9/2004 | Makita | | B62D 21/152 296/203.02 |
| 2005/0067860 A1 * | 3/2005 | Makita | | B62D 21/152 296/203.02 |
| 2005/0077711 A1 * | 4/2005 | Yasui | | B62D 21/152 280/735 |
| 2005/0082877 A1 * | 4/2005 | Gotou | | B62D 21/157 296/204 |
| 2006/0284449 A1 * | 12/2006 | Miyahara | | B62D 21/11 296/204 |
| 2007/0176443 A1 * | 8/2007 | Yasuhara | | B62D 21/152 293/133 |
| 2008/0296934 A1 * | 12/2008 | Shishido | | B62D 25/081 296/203.02 |
| 2011/0148151 A1 * | 6/2011 | Abe | | B60R 19/34 296/203.02 |
| 2011/0272971 A1 * | 11/2011 | Kihara | | B62D 25/2018 296/203.02 |
| 2012/0153679 A1 * | 6/2012 | Yasuhara | | B62D 21/152 296/203.02 |
| 2012/0248820 A1 * | 10/2012 | Yasui | | B60R 19/34 296/187.09 |
| 2013/0062911 A1 * | 3/2013 | Takeuchi | | B62D 25/082 296/203.02 |
| 2013/0069393 A1 * | 3/2013 | Kihara | | B62D 25/082 296/203.02 |
| 2013/0088048 A1 * | 4/2013 | Ichikawa | | B62D 25/08 296/203.02 |
| 2013/0270871 A1 * | 10/2013 | Bosche | | B62D 25/2018 296/204 |
| 2014/0035325 A1 * | 2/2014 | Naito | | B62D 25/082 296/203.02 |
| 2014/0246880 A1 * | 9/2014 | Barbat | | B62D 21/152 296/187.1 |
| 2015/0061325 A1 * | 3/2015 | Cho | | B62D 25/085 296/193.09 |

FOREIGN PATENT DOCUMENTS

| | | |
|---|---|---|
| DE | 20321813 U1 | 8/2010 |
| EP | 1840004 A1 | 10/2007 |
| JP | 02-246877 | 10/1990 |
| JP | 2001-063626 | 3/2001 |
| JP | 2003-226266 | 8/2003 |
| JP | 2004-123027 | 4/2004 |
| JP | 2005-112113 | 4/2005 |
| JP | 2006-137373 A | 6/2006 |
| JP | 2006-168538 | 6/2006 |
| JP | 2006-193118 A | 7/2006 |
| JP | 2007106370 A | 4/2007 |
| JP | 2010095031 A | 4/2010 |
| JP | 2010184530 A | 8/2010 |

\* cited by examiner

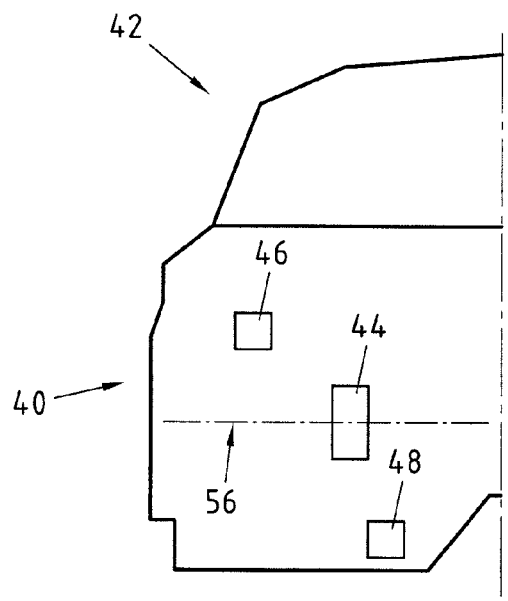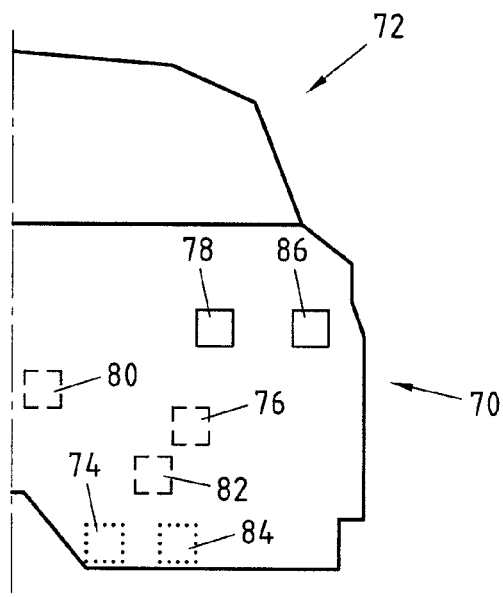
Fig.4a    Fig.4b
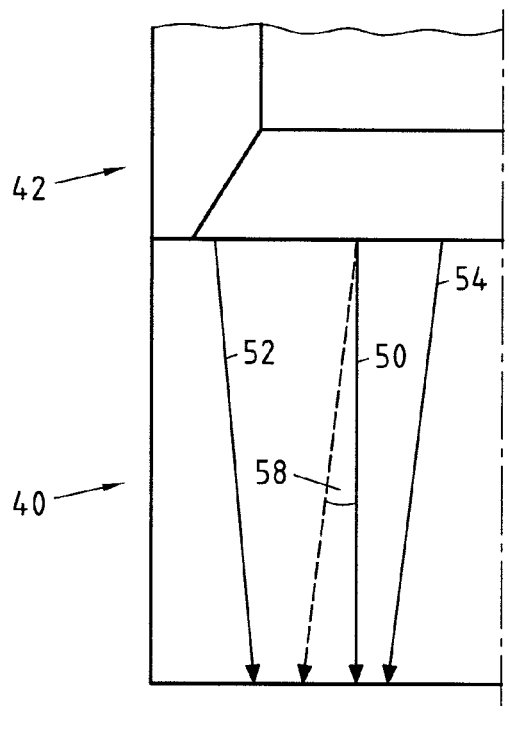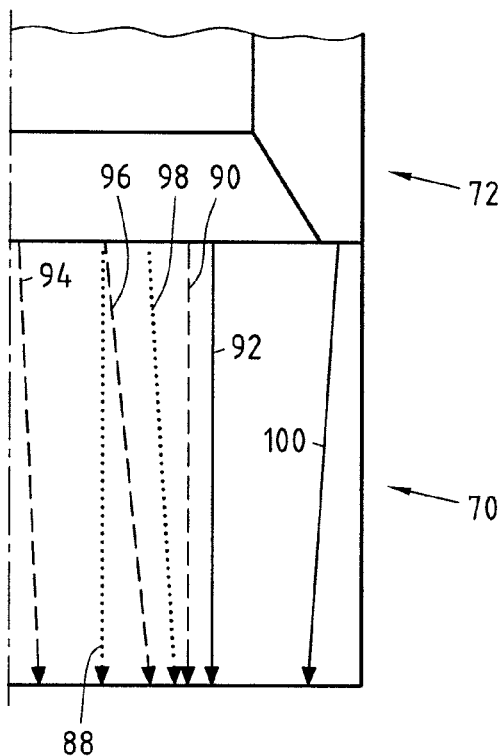
Fig.5a    Fig.5b

VEHICLE BODY AND USE THEREOF

CROSS-REFERENCE TO RELATED PATENT APPLICATIONS

This patent application is a continuation of PCT/EP2012/059345, filed May 21, 2012, which claims priority to German Application No. 102011103090.9, filed May 25, 2011, the entire teachings and disclosure of which are incorporated herein by reference thereto.

FIELD OF THE INVENTION

The invention relates to a vehicle body, in particular for electric motor vehicles, having a left-hand and a right-hand front region and at least one first longitudinal member extending in the longitudinal direction in a front region, wherein in the front region at least one second longitudinal member is provided, which is arranged outside the horizontal plane of the first longitudinal member and the direction of extension of which extends angularly to the direction of extension of the first longitudinal member at least in horizontal projection. Furthermore, the invention relates to an advantageous use of the vehicle body.

BACKGROUND OF THE INVENTION

Such a vehicle body is known for example from EP 1 840 004 A1. This patent application discloses a vehicle body front-part structure, whose frame is partly constituted by a pair of front side members, which are arranged on both sides in the vehicle width direction forming a front part of a passenger compartment of the vehicle. The said front part comprises at least three longitudinal members at the left-hand side as well as at the right-hand side, wherein the direction of extension of one of the longitudinal members extends angularly to the direction of extension of one of the other longitudinal members in horizontal projection.

A similar front part of a vehicle body comprising at least three longitudinal members at the left-hand side as well as at the right-hand side of the front part is also known from US 2002/0008408 A1.

Furthermore, DE 100 23 112 A1 discloses the front region of a motor vehicle with combustion engine, in which apart from the conventional left-hand and right-hand longitudinal members at least one further longitudinally extending first longitudinal member is provided, which is arranged in a plane offset to the plane of the other longitudinal member. Through the additional longitudinal member, a further load path is provided, so that in the event of a frontal impact the impact force can be distributed over a plurality of load paths and thus the individual components can be dimensioned smaller. In this way the weight of the vehicle body can be reduced.

The specifications for the resistance of a vehicle body to a frontal impact arise for example from the European New Car Assessment Program EuroNCAP. In addition, however, there is a need for vehicle bodies, which not only satisfy the requirements of EuroNCAP, but which in other impact scenarios also have a good resistance. At the same time the weight of the vehicle body should be as low as possible.

Against this background, the present invention has the object of providing a vehicle body with improved resistance to an oblique frontal impact but with a low overall weight.

SUMMARY OF THE INVENTION

This object is achieved with the above-mentioned vehicle body according to the invention in that the directions of extension of a plurality of second longitudinal members in a front region extend angularly in pairs to one another at least in horizontal projection.

It has been recognised that the resistance of a vehicle body can be increased in this way with respect to the impact forces occurring in an oblique frontal impact. The resistance of a longitudinal member is dependent upon the direction in which the force acts relative to the direction of extension of the longitudinal member. Thus, the resistance to forces acting in the direction of extension is particularly high and decreases at larger angles between the direction of force and the direction of extension. A longitudinal member thus has in a certain range of solid angles about its direction of extension a particularly high resistance. Through the angular course of second longitudinal members in different horizontal planes it is now possible for the solid angle ranges with a particularly high strength of the individual longitudinal members to point in different horizontal directions, so that the vehicle body as a whole has a high resistance in a larger solid angle range in the horizontal direction. In this manner, in particular, the angle between the direction of extension of a longitudinal member and the force acting in an oblique frontal impact is optimised, i.e. reduced towards 0° or increased towards 180°, so that an axial compression of individual longitudinal members and thus improved energy absorption occurs.

At the same time the vehicle body is stabilised by disposing the second longitudinal member outside the horizontal plane of the first longitudinal member through the resulting three-dimensional longitudinal member arrangement and achieves greater stiffness. As a result, in particular, of the three-dimensional structure of the theoretical neutral fibres, spaced components of the vehicle body result so that the area moment of inertia and thus also the stiffness thereof can be increased. Overall, therefore, a vehicle body having a stiffer structure and at the same time greater resistance to forces acting from different directions can be achieved.

A longitudinal member is understood to be a supporting element extending substantially in the longitudinal direction of the vehicle body, in particular a profile or a supporting element in a monocoque construction. The direction of extension of the longitudinal member, is understood to mean the direction vector along the longitudinal extension of the longitudinal member, pointing to the front i.e. towards the front end of the vehicle body. The angle between two directions of extension is accordingly defined as the angle between the two direction vectors applied in a common vector origin. The angle in horizontal projection is understood to be the angle included by the projections of the directions of extension in the horizontal plane. Accordingly, angularity in horizontal projection is understood to mean that the projections of the directions of extension extend in the horizontal plane at an angle to each other. The horizontal plane of a longitudinal member means the horizontal plane through the centre of gravity of the longitudinal member.

The first and/or the at least one second longitudinal member are preferably continuous. A continuous longitudinal member is understood to mean a longitudinal member extending in its direction of extension across the entire front region, i.e. preferably from the end wall to the front-end module. In this way, the stability and resistance of the respective longitudinal member, and thus of the entire vehicle body, increase. Preferably, a continuous longitudinal member has a frictional, material or positive connection to the front wall and/or the front-end module.

The resistance of a vehicle body is understood to mean the ability to absorb externally acting forces and transmitted energy, for example during a frontal impact, in particular by deformation, so that the forces can be transmitted in a controlled manner to the passenger compartment. The resistance of a vehicle body increases if at a given level of force, for example in the case of a frontal impact, the deformation path of the vehicle body is smaller. Stiffness or flexural strength, respectively, is understood to mean the resistance of a body to deformation by a force.

The terms left-hand and right-hand front region are selected according from the point of view of a driver seated in the vehicle body in the direction of travel.

The vehicle body is in particular suitable for motor vehicles with alternative drives, i.e. without combustion engines, for example, for electric motor vehicles. For motor vehicles with combustion engines the necessary drive components such as the motor, alternator, etc. take up lot of space, so that in the front region of the corresponding vehicle bodies only a small installation area remains and the designer has only a few degrees of freedom available in the design of the vehicle body. In vehicle bodies for motor vehicles with alternative drives the necessary drive components are smaller and/or can be arranged more flexibly, so that the installation area of the front region of the corresponding vehicle bodies is improved. In this way the number of degrees of freedom for the structural design of the vehicle body, in particular for the arrangement and alignment of the longitudinal members is increased, so that the vehicle body according to the invention can be particularly simple to create in vehicle bodies for alternative drives, in particular electric drives.

In a first preferred embodiment of the vehicle body in the left-hand front region and in the right-hand front region in each case at least three continuous longitudinal members are provided, wherein in both front regions in each case at least one first longitudinal member extends in the longitudinal direction, at least one second longitudinal member is arranged outside the horizontal plane of the first longitudinal member and the direction of extension of the second longitudinal member in relation to the direction of extension of the first longitudinal member extends at an angle at least in horizontal projection. It has been found that by disposing at least three longitudinal members in this way for each half of the vehicle a high resistance, in particular to oblique frontal impact forces, and a high stiffness of the vehicle body can be achieved simultaneously.

A further increase in the resistance can be achieved in a further preferred embodiment of the vehicle body in that the first and/or the second longitudinal member are made from high-strength or higher-strength steel. The first and/or second longitudinal members in particular can have thinner walls or smaller dimensions overall. This also allows a reduction in the installation space required for the longitudinal members.

Furthermore, in this way a saving in weight and a reduction in manufacturing costs can be achieved.

In a further preferred embodiment of the vehicle body the longitudinal members are partly or completely designed as hollow profiles preferably with a round cross-section. Hollow profiles offer a particularly high stability and simultaneous low material requirement and weight. Hollow profiles with a round cross-section are also particularly easy to manufacture. The hollow profiles can be produced for example as a rolled profile or by U-O-forming. Hollow profiles closed along their direction of extension can preferably be used, since these have a particularly high energy absorption capacity.

The overall resistance of the vehicle body can be improved in a further embodiment in that the direction of extension of a first longitudinal member in a front region and the direction of extension of a second longitudinal member in the front region in horizontal projection include an angle of between 5° and 45°, preferably between 10° and 35°, particularly preferably between 15° and 25°. These angular ranges have proven to be particularly advantageous in order to obtain a high resistance of the vehicle body to a straight and to an oblique frontal impact. If the angle is too small, i.e. in particular of less than 5°, the solid angle ranges of the longitudinal members having a particularly high resistance overlap excessively so that the resistance to an oblique frontal impact cannot be significantly improved. If the angle is too great, on the other hand, i.e. in particular greater than 45°, then the resistance of the vehicle body with respect to a straight frontal impact is weakened too much. With the abovementioned preferred angle ranges the resistance of the vehicle body in the angle ranges that are often critical in an oblique frontal impact is amplified without the overall resistance of the vehicle body being weakened. The overall resistance of the vehicle body can be further increased in that the longitudinal members are continuous.

In another embodiment of the vehicle body, a front region has a plurality of second longitudinal members arranged outside the horizontal plane of a first longitudinal member and the directions of extension of which extend at an angle to the direction of extension of the first longitudinal member at least in horizontal projection. Through the plurality of second longitudinal members, both the resistance and the stiffness of the vehicle body are improved in respect of the forces occurring in an oblique frontal impact. At least two or at least three second longitudinal members are preferably provided. It has been transpired that by replacing a longitudinal member with a plurality of, if appropriate, smaller, and in particular second longitudinal members a greater stiffness and resistance of the vehicle body, in particular in respect of the forces occurring in an oblique frontal impact, is achieved without the weight of the vehicle body having to be increased.

In a further preferred embodiment of the vehicle body, the weight of the vehicle body can be further reduced in that at least one second longitudinal member has a smaller cross-section than a first longitudinal member. Through the increase in resistance of the vehicle body achieved by the at least one second longitudinal member, preferably the plurality of second longitudinal members, the cross-section of the individual components can be reduced, and thus both the weight and the space requirement of the body components can be reduced. It has been recognised in particular that higher stiffness and stability can be achieved by a plurality of second longitudinal members instead of a single longitudinal member, so that the corresponding components, in particular the second longitudinal members, can be designed with a lower cross-section.

The resistance of the vehicle body is improved in a very large angular range with respect to forces acting in an oblique frontal impact, in that according to the invention the directions of extension of a plurality of second longitudinal members extend in pairs at an angle in a front region, at least in horizontal projection. According to this invention, therefore, a plurality of longitudinal members is provided the directions of extension of which run in different directions. By superposition of the solid angle ranges of the individual longitudinal members with a particularly high resistance, the vehicle body as a whole has a high resistance in a wide angle range. In the event of an oblique frontal impact in particular an axial compression of one or a plurality of second longitudinal members takes place, whereby a large part of the impact energy can be absorbed.

In a further preferred embodiment of the vehicle body in a front region at least one second longitudinal member is arranged in such a way that its end facing the front is located more externally in the transverse direction than its end facing the rear. The term "externally in the transverse direction" is understood to mean in the left-hand front region the left and in the right-hand front region the right of the vehicle body. In this way, it is possible for the direction of extension of such a longitudinal member in a front region to point in a direction from which in an oblique frontal impact the greatest force is expected. As a result, the energy can be absorbed particularly well by axial deformation of this longitudinal member.

The stiffness and resistance of the vehicle body with respect to a frontal impact can be further improved in a further embodiment in that a front region has at least two first longitudinal members extending in the longitudinal direction and substantially parallel to one another.

In the further preferred embodiment of the vehicle body the longitudinal members in the right-hand front region are arranged substantially mirror-symmetrically to the longitudinal members in the left-hand front region. In this way, the vehicle body is highly symmetrical and thus has an even weight distribution so that there are positive effects on its stress and handling characteristics. Furthermore, in this way, a simpler and more effective production of the vehicle body, in particular for left- and right-hand drive, is possible.

It has been found that the resistance and stiffness of the vehicle body is increased particularly greatly when according to a further preferred embodiment in a front region at least three, preferably at least four, more preferably at least five, in particular at least eight longitudinal members are provided. This concerns in particular both first longitudinal members and second longitudinal members. This embodiment is in particular based on the knowledge that an otherwise conventionally used single profile can be very flexibly replaced by a plurality or a multiplicity of profiles, which can then if necessary be designed with a small cross-section. In one front region or in both front regions, in particular, at least two, preferably at least three, more preferably at least four, in particular at least seven second longitudinal members are provided. In this way, in the event of an oblique frontal impact a plurality of second, preferably smaller longitudinal members are axially deformed, whereby better energy absorption can be achieved compared to a single first longitudinal member. As a result, an increase in the resistance of the vehicle body against impact forces acting from different directions is achieved.

To further increase the resistance or the stiffness of the vehicle body in a further exemplary embodiment, in a front region at least two longitudinal members, in particular a first longitudinal member and a second longitudinal member, are connected to each other, preferably by a profile, or a sheet metal strip. By connecting two longitudinal members in particular the flow of forces in the event of an oblique frontal impact can be better distributed over the individual longitudinal members, so that the resistance of the vehicle body is retained, despite the longitudinal members possibly being designed with a lower cross-section.

The vehicle body as described above can be used in a further teaching of the present invention according to the invention for the manufacture of a motor vehicle without a combustion engine, in particular of an electric motor vehicle. It has been found that the reduced space requirement of the drive unit in such motor vehicles increases flexibility in the design and arrangement of the body components, so that the vehicle body according to the invention can be used particularly advantageously with these vehicles. Furthermore, the vehicle body according to the invention is advantageous for motor vehicles without a combustion engine specifically because the very limited range of such vehicles up until now can be increased as a result of the weight savings made possible by the vehicle body according to the invention.

BRIEF DESCRIPTION OF THE DRAWINGS

Further features and advantages of the present invention can be inferred from the following description of a plurality of exemplary embodiments, wherein reference is made to the attached drawing. The drawing shows as follows:

FIGS. 4a-b a second and a third exemplary embodiment of the vehicle body according to the invention in a schematic front view;

FIGS. 5a-b the exemplary embodiments of FIGS. 4a-b in schematic top view and

DETAILED DESCRIPTION OF THE INVENTION

Figure 1:
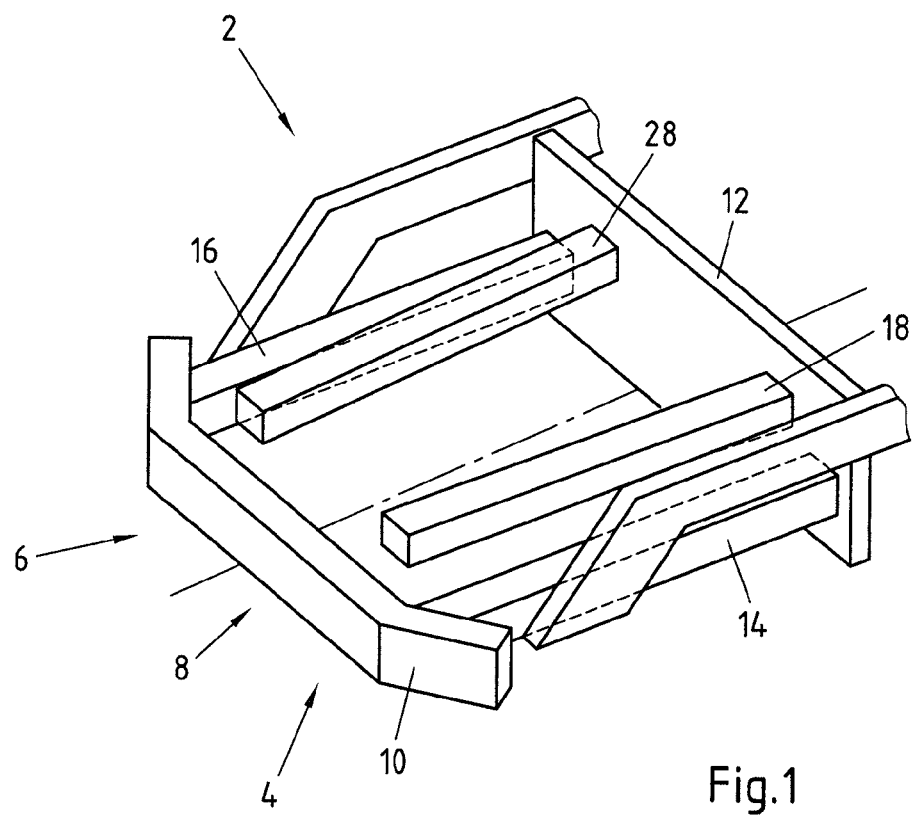
FIG. 1 a first exemplary embodiment of the vehicle body according to the invention in a schematic perspective view.
Figure 2:
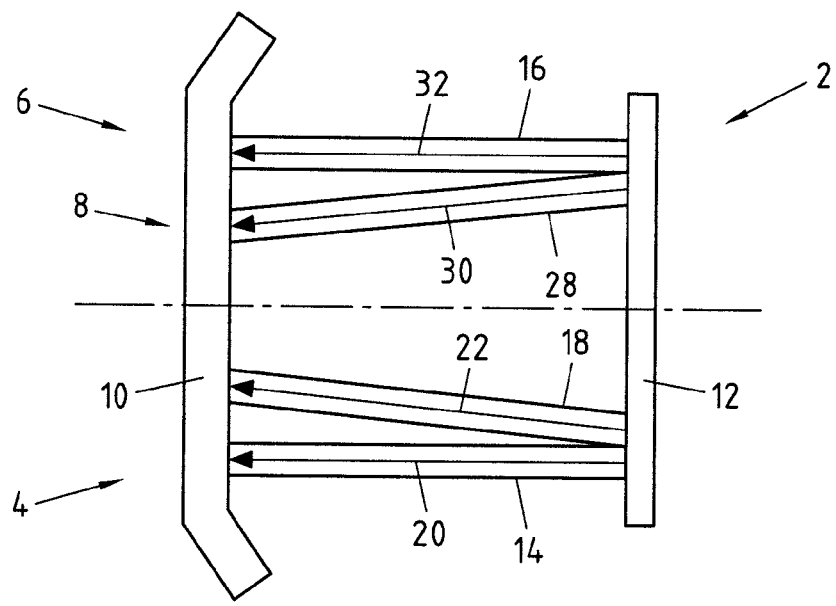
FIG. 2 the exemplary embodiment of FIG. 1 in a schematic top view.

A first exemplary embodiment of the vehicle body according to the invention is shown in FIG. 1 in perspective view and in FIG. 2 in top view. The vehicle body 2 has a left-hand front region 4 and a right-hand front region 6. The terms "left" and "right" are selected here from a driver's point of view. The front regions 4, 6 are delimited at the front by the front-end module 8, in particular by the bumper 10. Towards the back, the front regions 4, 6 are delimited by the end wall 12, which separates the engine compartment from the passenger compartment. The left-hand 4 and right-hand 6 front regions in each case have a first longitudinal member 14, 16 extending in the longitudinal direction, which in FIG. 1 extends continuously from the end wall 12 to the front-end module 8. To increase the stiffness of the vehicle body 2 and the resistance to an oblique frontal impact in the left-hand front region 4 a second longitudinal member 18 is further provided, which is arranged at an offset outside the horizontal plane of the first longitudinal member 14, namely, in the present exemplary embodiment upwards. The direction of extension of the second longitudinal member 18 extends at an angle to the direction of extension of the first longitudinal member 14 in horizontal projection at an angle of between 5° and 45°, preferably of between 10° and 35°. In the right-hand front region 6, a second longitudinal member 28 is also provided which is arranged outside the horizontal plane of the first longitudinal member 16 and the direction of extension 30 of which extends at an angle to the direction of extension 32 of the first longitudinal member 16 in horizontal projection.

Figure 3A:
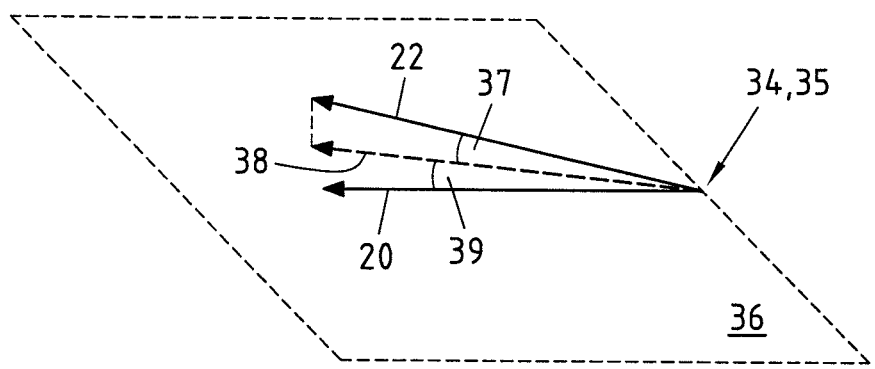
FIGS. 3a-b determination of the angle between the directions of extension of two longitudinal members in horizontal projection.
Figure 3B:
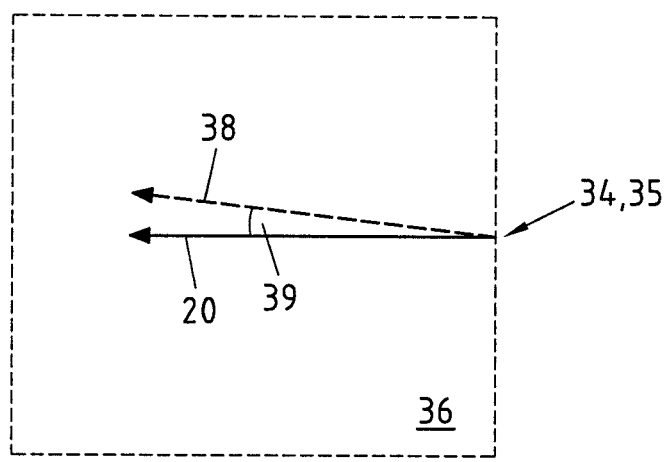

The determination of the angle in horizontal projection is shown in FIG. 3a in perspective view and FIG. 3b in top view. The directions of extension 20, 22 of the longitudinal members 14, 18 are shown as direction vectors, wherein the vector origin 34 of the direction of extension 22 has been moved to the vector origin 35 of the direction of extension 20. Since the direction of extension 22 extends obliquely to the horizontal plane 36 of the first longitudinal member 14 at an angle 37, in FIG. 3a the projection 38 of the direction of extension 22 in the horizontal plane 36 is also shown. Between the projection 38 and the direction of extension 20 the angle sought 39 results in horizontal projection.

In the exemplary embodiment illustrated in FIGS. 1 and 2, the longitudinal members 16, 28 are arranged in the right-hand front section 6 substantially mirror-symmetrically to the longitudinal members 14, 18 in the left-hand front region. The position of the plane of symmetry is indicated by the dash-dot line. Thus, for example, the angle between the respective first and second longitudinal members is of equal size. Alternatively, it is of course also possible to provide an asymmetrical arrangement of the longitudinal profiles, for example to provide an asymmetric space for the components necessary for the drive. Overall, the design of the vehicle body offers a high level of flexibility. The longitudinal members 18, 29 may also extend downwards and at an incline, so that the distance in the front-end module region between the longitudinal members 16 and 28 and 14 and 18 is less than in the front wall region. This approach can contribute to an increase in resistance.

The longitudinal members 14, 16, 18, 28 are preferably made of high-strength or higher-strength steel. Furthermore, preferably hollow profiles, for example of rectangular cross-section or also with a round cross-section are involved. Other cross-sections are also conceivable, however, such as polygons or plus-form.

FIG. 4a shows a second, and FIG. 4b a third exemplary embodiment of a vehicle body according to the invention in a schematic front view. FIG. 5a shows the second, and FIG. 5b the third exemplary embodiment also in top view.

In FIG. 4a, a right-hand front region 40 of a vehicle body 42 is shown, in which a first longitudinal member 44 extending in a longitudinal direction and two second longitudinal members 46 and 48 are arranged. FIG. 5a shows the longitudinal members 44, 46 and 48 for the sake of clarity only as direction vectors, which indicate the respective directions of extension 50, 52 and 54. The second longitudinal members 46 and 48 are each outside the horizontal plane 56 of the first longitudinal member 44, namely, the second longitudinal member 46 is arranged above and the second longitudinal member 48 below the horizontal plane 56. Of course, another arrangement of the longitudinal members, in particular an angular direction is also conceivable. The directions of extension 52, 54 of the second longitudinal members 46, 48 extend in horizontal projection at an angle with respect to the direction of extension 50 of the first longitudinal member 44. FIG. 5a shows an example of the angle 58 between the direction of extension 50 of the longitudinal member 44 and the direction of extension 54 of the longitudinal member 48. To this end the direction of extension 54 is in addition drawn as a dashed direction vector from the vector origin of the direction of extension 50.

It has been found that by the provision of at least three longitudinal members 44, 46, 48 for each half of the vehicle, i.e. in each case in the left-hand and right-hand front region, a very high stiffness and resistance of the vehicle body can be achieved. With the vehicle body 42 the second longitudinal members 46, 48 preferably also have directions of extension 52, 54 that are at an angle to one another. In this manner, the resistance of the vehicle body 42 with respect to impact forces acting from different directions is improved.

FIG. 4b shows a left-hand front region 70 of a vehicle body 72 shown. The left-hand front region 70 has a total of seven longitudinal members, wherein the longitudinal members 74, 76, 78 are designed as first longitudinal members extending in the longitudinal direction and the longitudinal members 80, 82, 84, 86 as second longitudinal members, wherein in particular an angular progression of at least one second longitudinal member is also conceivable. The longitudinal members 74, 76, 78, 80, 82, 84, 86 are shown in FIG. 5b for the sake of clarity only as direction vectors, which indicate the respective directions of extension 88, 90, 92, 94, 96, 98, 100. Direction of extension 88 is therefore associated with longitudinal member 74, direction of extension 90 is associated with the longitudinal member 76, etc. For greater clarity of display the longitudinal members 74 and 84 arranged in a lower plane in FIG. 4b and the associated directions of extension 88 and 98 in FIG. 5b are shown by dotted lines, and the longitudinal members 78 and 86 arranged in an upper plane in FIG. 4b and the associated directions of extension 92 and 100 in FIG. 5b are shown as solid lines and the other longitudinal members and associated directions of extension are shown by dashed lines.

By providing a plurality of longitudinal members 74, 76, 78, 80, 82, 84, 86, in particular a plurality of second longitudinal members 80, 82, 84, 86, the stiffness and the resistance of the vehicle body 72 can be greatly increased. Alternatively or additionally, the total weight of the vehicle body can also be reduced by at least one longitudinal member, preferably a second longitudinal member, being designed with a smaller cross-section.

The second longitudinal members 80, 82, 84, 86 are as shown in FIG. 4 in each case outside the horizontal plane of at least one of the first longitudinal members 74, 76, 78. Optionally, the second longitudinal members can even be arranged outside the planes of all first longitudinal members 74, 76, 78.

The directions of extension 94, 96, 98, 100 of the second longitudinal members 80, 82, 84, 86 progress in horizontal projection in each case at an angle to the directions of extension 88, 90, 92 of the first longitudinal members 74, 76, 78. Preferably, the directions of extension 94, 96, 98, 100 of the second longitudinal members 80, 82, 84, 86 are in each case in pairs at an angle to each other and therefore point in different directions. In this way the resistance can be increased in different directions, and thus in a large angular range with respect to applied forces, for example in an oblique frontal impact.

Figure 6:
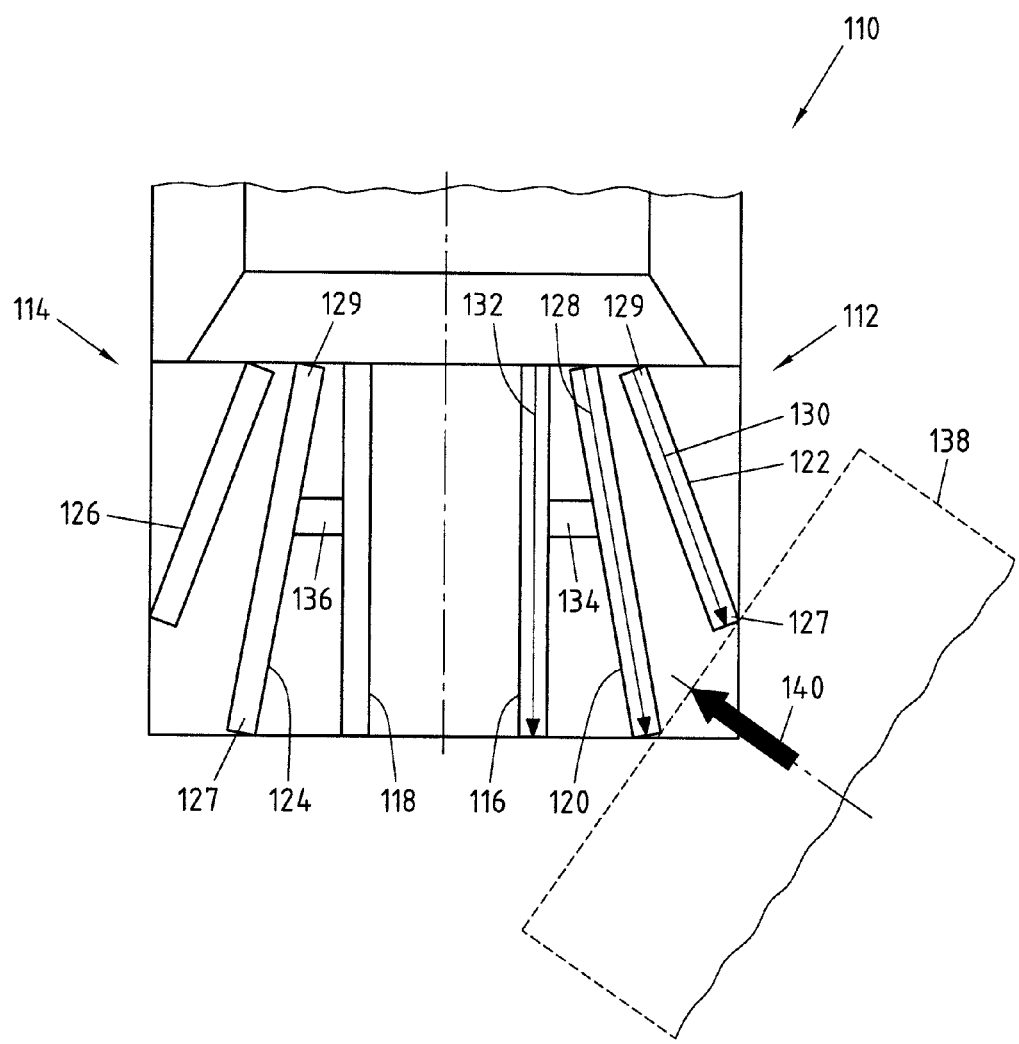
FIG. 6 a fourth exemplary embodiment of the vehicle body according to the invention.

FIG. 6 shows a fourth exemplary embodiment of the vehicle body according to the invention. The vehicle body 110 has a left-hand front region 112 and a right-hand front region 114, wherein in the front regions 112, 114 in each case a first longitudinal member 116, 118 extending in the longitudinal direction and in each case two second longitudinal members 120, 122 and 124, 126 are provided. The second longitudinal members 120 and 122 are outside the horizontal plane of the first longitudinal member 116 and their directions of extension 128, 130 extend in horizontal projection at an angle with respect to the direction of extension 132 of first longitudinal member 116. Furthermore, the directions of extension 128, 130 of second longitudinal member 120, 122 in horizontal projection are also at an angle to one another. The longitudinal members 118, 124, 126 in the right-hand front region 114 are arranged in mirror image to those of the left front region 112. To increase the stiffness of the vehicle body 110 the first longitudinal members 116, 118 are also in each case connected via a welded sheet metal strip 134, 136 to a second longitudinal member 120, 124.

The second longitudinal members 120, 122, 124, 126 are further arranged, in particular, such that the end 127 facing the front side extends in the transverse direction further outwards than the end 129 facing the rear. As a result, the resistance of the vehicle body 110 with respect to an oblique frontal impact is considerably increased, as explained in the following.

FIG. 6 shows the situation for an oblique frontal impact, in which a vehicle 134 runs into the vehicle body 110 obliquely from the front. The force 140 from vehicle 138 acting on the vehicle body 110 is shown as an arrow. While the force 140 acts upon the first longitudinal member 116 substantially laterally, the directions of extension 128, 130 of the second longitudinal members are in each case in an axis which has a flatter angle to the direction of the force 140. Thus, when the collision occurs there is also an axial compression in particular of the second longitudinal member 122, but also of the second longitudinal member 120, so that a large proportion of the impact energy can be absorbed. Due to the higher energy absorption capability of the second longitudinal members 120, 122 in the axial direction, the longitudinal members can be designed to have a smaller cross-section and/or a thinner wall, without the vehicle body 110 losing its resistance to an oblique frontal impact.

The invention claimed is:

1. A vehicle body, for electric motor vehicles, comprising:
a left-hand front region and a right hand front region including longitudinal members made up of first longitudinal members and second longitudinal members,
wherein the left-hand front region and the right-hand front region each include at least three continuous longitudinal members, the at least three continuous longitudinal members comprising the first longitudinal members and the second longitudinal members,
wherein in the left-hand front region and the right hand front region an at least one first longitudinal member extends in the longitudinal direction, and an at least one second longitudinal member is arranged outside a horizontal plane of the at least one first longitudinal member and a direction of extension of the at least one second longitudinal member extends at an angle to the direction of extension of the at least one first longitudinal member at least in horizontal projection,
wherein in one of the left-hand front region and the right hand front region the second longitudinal member comprises a plurality of the second longitudinal member, the directions of extension of the plurality of second longitudinal members extend angularly in pairs to one another at least in horizontal projection, and
wherein in one of the left-front region and right-front region, a one of the second longitudinal members is arranged in such a way that its end facing the front is located more externally in the transverse direction than its end facing the rear.

2. The vehicle body according to claim 1, wherein the first longitudinal members are made of high-strength or higher-strength steel.

3. The vehicle body according to claim 1, wherein the longitudinal members have a hollow profile with a circular cross-section.

4. The vehicle body according to claim 1, wherein in one of the left-front region and right-front region, the direction of extension of a one of the first longitudinal members and the direction of extension of a one of the second longitudinal members in horizontal projection include an angle of between 5° and 45°.

5. The vehicle body according to claim 1, wherein the plurality of second longitudinal members, are arranged outside the horizontal plane of a first longitudinal member and have directions of extension extending angularly to the direction of extension of the first longitudinal member at least in horizontal projection.

6. The vehicle body according to claim 1, wherein a one of the second longitudinal members has a smaller cross-section than a one of the first longitudinal members.

7. The vehicle body according to claim 1, wherein a one of the second longitudinal members is arranged to cope with the stress caused by the forces of an oblique frontal impact.

8. The vehicle body according to claim 1, wherein one of the left-front region and right-front region has at least two longitudinally extending and substantially mutually parallel first longitudinal members.

9. The vehicle body according to claim 1, wherein the longitudinal members in the right-hand front region are arranged substantially mirror-symmetrically to the longitudinal members in the left-hand front region.

10. The vehicle body according to claim 1, wherein in one of the left-front region and right-front region at least four longitudinal members are provided.

11. Vehicle body according to claim 1, wherein in a front region at least two longitudinal members, in particular a first longitudinal member and a second longitudinal member are interconnected, preferably by a profile or a strip of sheet metal.

12. Use of a vehicle body according to claim 1 for producing a vehicle without a combustion engine, in particular an electric motor vehicle.

13. The vehicle body according to claim 1, wherein the at least one second longitudinal member is made of high-strength or higher-strength steel.

14. The vehicle body according to claim 1, wherein the at least one first longitudinal member and the at least one second longitudinal member are made of high-strength or higher strength steel.

15. The vehicle body according to claim 1, wherein the at least three continuous longitudinal members have a partial hollow profile with a circular cross-section.

16. The vehicle body according to claim 1, wherein in one of the left-front region and right-front region at least five longitudinal members are provided.

17. The vehicle body according to claim 1, wherein in one of the left-front region and right-front region at least eight longitudinal members are provided.

18. The vehicle body according to claim 1, wherein in one of the left-front region and right-front region at least a one of the first longitudinal member and a one of the second longitudinal member are interconnected by a profile of sheet metal.

19. The vehicle body according to claim 1, wherein in one of the left-front region and right-front region at least a one of a first longitudinal member and a one of a second longitudinal member are interconnected by a strip of sheet metal.

* * * * *